(12) United States Patent
Gebauer

(10) Patent No.: US 6,905,595 B2
(45) Date of Patent: Jun. 14, 2005

(54) SCALABLE LIQUID DISTRIBUTION SYSTEM FOR LARGE SCALE CHROMATOGRAPHY COLUMNS

(75) Inventor: Klaus Gebauer, Uppsala (SE)

(73) Assignee: Amersham Biosciences AB, Uppsala (SE)

(*) Notice: Subject to any disclaimer, the term of this patent is extended or adjusted under 35 U.S.C. 154(b) by 52 days.

(21) Appl. No.: 10/476,909
(22) PCT Filed: May 10, 2002
(86) PCT No.: PCT/EP02/05145
§ 371 (c)(1), (2), (4) Date: Nov. 4, 2003
(87) PCT Pub. No.: WO02/092188
PCT Pub. Date: Nov. 21, 2002

(65) Prior Publication Data
US 2004/0140252 A1 Jul. 22, 2004

(30) Foreign Application Priority Data
May 11, 2001 (GB) .............................................. 0111485

(51) Int. Cl.⁷ .............................................. B01D 15/08
(52) U.S. Cl. .................... 210/198.2; 210/456; 210/656; 96/105
(58) Field of Search ................................ 210/656, 658, 210/659, 198.2, 198.3, 456; 95/82, 85; 96/101, 105, 107

(56) References Cited

U.S. PATENT DOCUMENTS

| 4,354,932 A | * 10/1982 | McNeil .................... 210/198.2 |
| 4,450,082 A | 5/1984 | Tanouchi et al. |
| 4,537,217 A | * 8/1985 | Allen, Jr. ................ 137/561 A |
| 4,557,830 A | * 12/1985 | Onitsuka et al. ......... 210/198.2 |
| 5,013,433 A | * 5/1991 | Shalon .................... 210/198.2 |
| 5,141,635 A | 8/1992 | LePlang et al. |
| 5,324,426 A | * 6/1994 | Joseph et al. ............ 210/198.2 |
| 5,354,460 A | * 10/1994 | Kearney et al. ......... 210/198.2 |
| 6,527,951 B1 | * 3/2003 | Tuvim ..................... 210/198.2 |

FOREIGN PATENT DOCUMENTS

| DE | 41 18 501 | 12/1992 |
| EP | 0 108 242 | 5/1984 |
| JP | 63 173960 | 7/1988 |
| JP | 03 194465 | 8/1991 |

OTHER PUBLICATIONS

Patent Abstracts of Japan, vol. 012, No. 451 (P–791), Nov. 28, 1988.
Patent Abstracts of Japan, vol. 015, No. 460 (P–1278), Nov. 21, 1991.

* cited by examiner

Primary Examiner—Ernest G. Therkorn
(74) Attorney, Agent, or Firm—Royal N. Ronning, Jr.; Yongyang J.; Stephen G. Ryan

(57) ABSTRACT

A uniform fluid distribution system (2) for use with a liquid transfer system (100) for maintaining an interface between liquid phases within a large scale separator system including a cell into which liquid may be introduced as discrete phases at an inlet zone occupying a first approximately transverse cross-sectional region of said cell and outputted at an outlet zone occupying a second approximately transverse cross-sectional region of said cell. Said distribution system comprises at least one liquid inlet (24) and at least two distribution outlets (32), which are connected by an internal flow connection system (36). Wherein said distribution outlets (32) are formed as concentric annular or rectilinear distribution-slots (32), each with an unique radius/distance to the midpoint r to the midpoint between an inner slot-radius/distance to the midpoint and an outer slot-radius/distance to the midpoint, said radii/distances to the midpoint defining a slot-width w, through which annular distribution-slot (32) liquid entering said inlet (24) is distributed to said cell along an approximately horizontal plane, and said internal flow connection system (36) is formed such that it provides an essentially uniform fluid flow through the distribution-slots (32).

17 Claims, 8 Drawing Sheets

SCALABLE LIQUID DISTRIBUTION SYSTEM FOR LARGE SCALE CHROMATOGRAPHY COLUMNS

CROSS REFERENCE TO RELATED APPLICATION

This application is a filing under 35 U.S.C. §371 and claims priority to international patent application number PCT/EP02/05145 filed May 10, 2002, published on Nov. 21, 2002 as WO02/092188, and to foreign application number 0111485.9 filed in Great Britain on May 11, 2001, the entire disclosures of which are hereby incorporated by reference.

FIELD OF THE INVENTION

The present invention relates to a liquid distribution system for chromatography columns. More specifically, the invention relates to a scalable liquid distribution system for large-scale chromatography columns.

BACKGROUND OF THE INVENTION

In separation procedures, particularly in liquid chromatography, the fluid distribution system is critical to the overall performance, and becomes more so as the cross-section of the chromatographic column increases.

Columns used in liquid chromatography typically comprise a body-forming structure enclosing a porous media through which a carrier liquid flows, with separation taking place by material distribution between the carrier liquid and solid phase of the porous media Typically, the porous media is enclosed in the column as a packed bed, typically formed by consolidating a suspension of discrete particles. An alternative to the packed bed is the so-called expanded or fluidised bed, where effective porosity and volume of the expanded bed depends on the fluid velocity. The term 'packing' shall be used in the following to describe the porous solid phase in both types of chromatography. The efficiency of the chromatographic separation relies in both modes strongly on the liquid distribution and collection system at the fluid inlet and outlet of the packing.

Ideally, the carrier liquid is uniformly introduced throughout the surface at the top of the packing, flows through the packing at the same velocity throughout the packing cross section, and is uniformly removed at the plane defined by the bottom of the packing.

Conventional distribution systems for use in liquid chromatography must address a number of inherent problems that have deleterious effects on the separation efficiency of the column. Among these problems are (a) non-uniform initial fluid distribution at the top of the packing as well as non-uniform fluid collection at the outlet of the packing and (b) "channelling", which is described by a non-uniform flow field within a packing, typically caused by pressure gradients that are perpendicular to the mean direction of velocity due to pressure loss in the fluid distribution system.

With respect to the channelling problem, conventional distribution systems often rely upon the pressure drop in the distributor of a vertical chromatographic column to distribute the fluid uniformly horizontally. Whenever the pressure drop through the column is high relative to the pressure drop in the distributor, however, the fluid tends to channel in the centre of the column causing excessive dispersion. This severely limits the effectiveness of chromatographic separations and is particularly acute for large diameter columns.

The problem of non-uniform initial fluid distribution refers generally to the problem of applying a sample volume simultaneously over the cross-sectional area of the packing. Without a simultaneous introduction of fluid in the plane defined by the top of the packing, it is virtually impossible to achieve a distinct movement of a sample zone or front through the packing.

Both problems will lead to increased dispersion in the chromatographic system by broadening the convective residence time distribution of a tracer substance transported with the fluid throughout the system. The dispersion generated by the liquid distribution system has to be controlled in relation to the amount of dispersion introduced by the chromatographic packing itself by means of diffusion and mixing effects.

Standard fluid distribution systems consist of one central inlet for the mobile phase in combination with a thin distribution channel (gap) behind the filter (woven net or sinter) confining the top and bottom plane of the inlet and outlet of the packing. In theory and from experience it is known that such a system deteriorates in performance with increasing diameter of the column. This is due to the residence time difference between fluid elements travelling from the inlet to the outer column wall and those fluid elements which directly can enter the net and the packed bed region below the inlet port. This difference in residence time is enlarged with column diameter and leads to chromatographic band broadening which becomes most severe with small particles. This problem corresponds to the non-uniform initial fluid distribution.

Columns with multiple inlets have also been proposed. Multiple inlets reduce the residence time differences but are expensive to produce.

Another well-known technique for distribution is the plate system, typically utilising a plate with face openings along radii on the plate to achieve fluid distribution by decreasing the resistance of fluid flow through the plate with increasing radius. A drawback of the plate system is that the spacing and size of the openings in the plate must be calculated for any particular fluid according to its viscosity and other physical characteristics (the rheology of the fluid) so that the system will work properly with that particular fluid at a particular flow rate. A drawback to the plate system, however, is that variation in the fluid being distributed or the flow rate will affect the uniformity of the distribution.

A third technique is disclosed in U.S. Pat. No. 4,537,217, which is comprised of a layered distribution structure, comprising a first layer that acts as a cover and in which a fluid inlet is formed, a second layer wherein a number of channels are formed which each terminates in an outlet extending through the second layer. The outlets form a well-distributed pattern, which provides a high degree of fluid distribution on the packing side of the distribution system. Although this system provides excellent distribution, it suffers from several disadvantages, especially in that it is difficult to produce especially for a large number of channels at large column diameters. There is further a risk for sanitary problems due to the troublesome cleaning of such a large amount of channels of such small size, and in that it is impossible to prevent fluid from entering in between the two layers.

As a further development of the last technique, U.S. Pat. No. 5,354,460 discloses the use of a large number of fan shaped "step-down nozzles", similar to the layered distribution structure presented above, that are arranged in concentric rings and interconnected by a manifold system. Due to the modular construction this system may be produced using large-scale production techniques, but the high grade of complexity still results in high production costs. Like the layered distribution structure, complex systems of this type are extremely difficult to clean; whereby there is an obvious risk for sanitary problems.

Another problem is that excising techniques makes it difficult to upscale from laboratory columns (small diameter) to production columns of large diameter, as it is extremely difficult to forecast the distribution characteristics. Whereby large-scale experiments have to be done to adapt laboratory processes for large-scale production to achieve an optimal process. Furthermore, it is difficult and expensive to alter the distribution characteristics of such systems.

Despite the high level of activity in the field of chromatography over many years, and the many distribution systems proposed, both speculative as well as experimentally evaluated, the need still exists for an effective, simple distribution system that will permit large liquid chromatographic columns to be used. Further there is need for a distribution system which is easily scaleable not only to different column sizes, but also to different individual combinations of packing geometry and packing properties, fluid properties and fluid velocities, and application types. To date, no distribution system is available which meets this end.

As used herein and in the appended claims: the term "fluid system" is intended to designate the apparatus in which liquid is either introduced to or withdrawn from a cell at a zone approximately transverse the direction of flow through the cell. The term "cell" is intended to include the terms "vessel" and "column", as well as any other structure utilised by practitioners of the separation arts, to effect a separation and/or extraction of components from an admixture by bringing the admixture into contact with solid or liquid exchange media, above referred to as the packing. "Cross-sectional zone" (or region) refers to a region within a cell bounded by cross sections of the cell-oriented transverse (typically approximately normal) the longitudinal direction of flow through the cell. "Longitudinal direction of flow" refers to the direction of flow from an inlet towards an outlet within a cell. "Longitudinal" is used consistently to designate the dominant flow path of fluid through a cell without regard to direction. "Flow connection system" refers to a system of channels or paths that connect two points in a fluid circuit. "Distribution system" refers to structures through which fluids are introduced to a cell and "collection system" refers to structures used to withdraw fluids from a cell, in each instance from a cross-sectional zone.

SUMMARY OF THE INVENTION

The object of the invention is to provide a liquid distribution system for a fluid system, which overcomes the drawbacks of the prior art systems. This is achieved by the liquid distribution system as defined in claim 1.

One advantage with such a liquid distribution system is that it provides excellent distribution characteristics.

Another advantage is that the proposed liquid distribution system is inexpensive to produce, compared with existing systems, due to its symmetric design.

Still a further advantage is that the proposed liquid distribution system reduces the risk for sanitary problems, due to the simple design comprising few interconnected elements.

Still another advantage is that the proposed liquid distribution system facilitates a 'design by calculation' and therefore an a priori optimisation of its mean dimensions to achieve optimal performance and scalability.

Still a further advantage is that the proposed liquid distribution system is scalable by adjusting the number of pre-distribution levels (0,1,2,3 . . . ) at a given column diameter and by adjusting the geometry of the fluid paths (channel height) at a given pre-distribution level.

Embodiments of the invention are defined in the dependent claims.

DETAILED DESCRIPTION OF THE INVENTION

The present invention disclose a uniform fluid distribution system 2 for use with a liquid transfer system for maintaining an interface between liquid phases within a large scale separator system including a cell of circular cross-section. Into which cell, liquid may be introduced as discrete phases via the distribution system 2 to an inlet zone occupying a first approximately transverse cross-sectional region of said cell whereby a discrete liquid phase plug is developed. Thereafter the discrete liquid phase plug migrates approximately longitudinally in a direction normal said first cross-sectional region towards an outlet zone occupying a second approximately transverse cross-sectional region of said cell. Generally, the distribution system 2 comprises at least one liquid inlet and at least two distribution outlets, which are connected by an internal flow connection system.

Basically, the present invention describes the idea of pre-distributing a fluid by subdividing a fluid path into two new paths; thus a branching by a factor of two is achieved. As the features of the distribution system according to the present invention may be applied to a collection system at the column outlet (one channel is collecting from two channels etc.), it should be understood that such collection systems are to be included within the scope of this application. In contrast to so-called fractal distributors as known from prior art, the proposed design is symmetric, preferably rotationally symmetric, which minimises production cost. Further, the symmetry simplifies a 'design by calculation' of the most favourable liquid distributor for a given separation task by applying numerical methods of 'computational fluid dynamics'. The mechanical simplicity also reduces the risk for sanitary problems.

Due to the symmetric design of the proposed distribution system 2, said distribution outlets become concentric essentially annular or rectilinear distribution-slots, with a radius/distance r to the midpoint between an inner slot radius/distance and an outer slot radius/distance, said radii/distances defining a slot-width w. Liquid entering said inlet is thus distributed to said cell along an approximately horizontal plane through the annular/rectilinear distribution-slots.

To achieve optimum performance the internal flow connection system is formed such that it provides an essentially uniform fluid flow through the distribution-slot, and such that essentially no broadening of the phase plug occurs.

Figure 1:
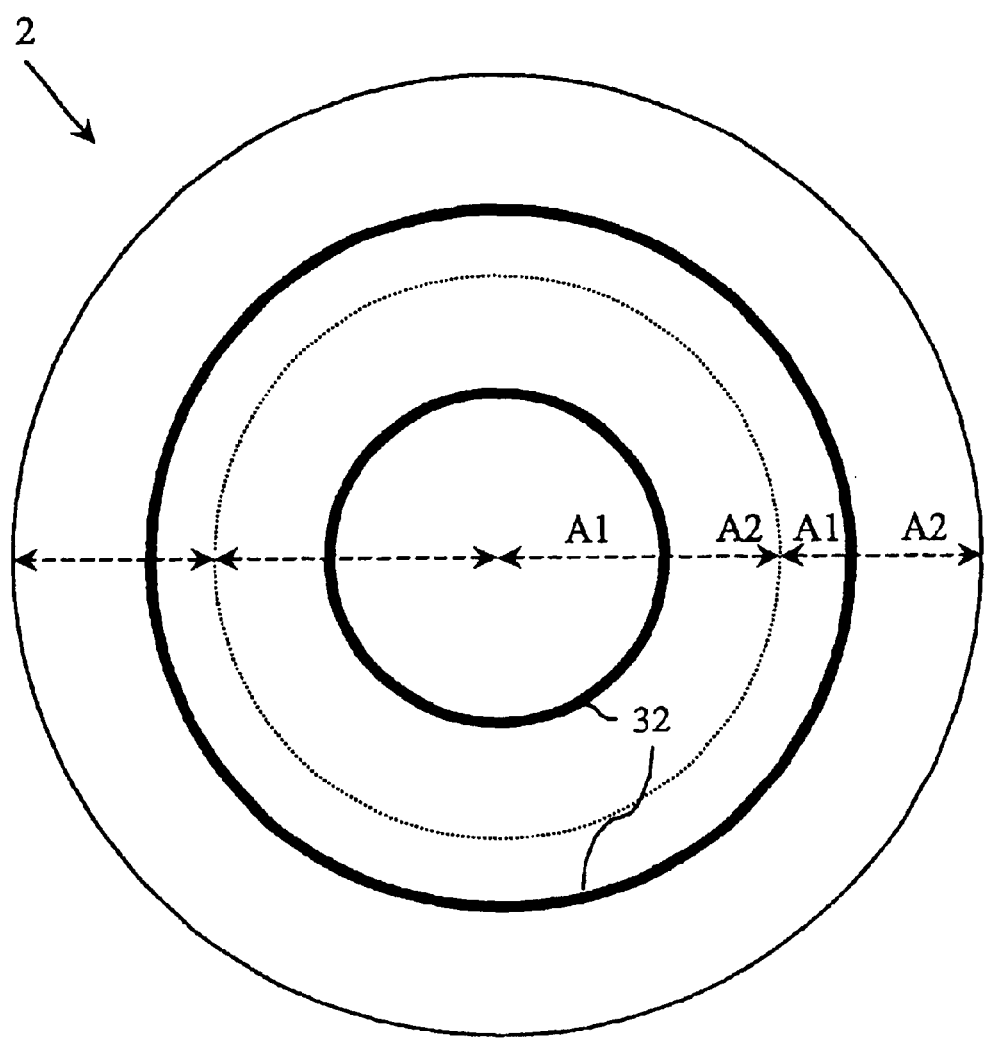
FIG. 1 shows a bottom view of a distribution system according to the invention.

FIG. 1 shows a bottom view of a first embodiment of a distribution system according to the present invention, comprising two concentric annular distribution slots 32. As is shown in FIG. 1, each annular distribution-slot 32 provides a distributed liquid flow to an associated central distribution-area A1 extending inwards from r and a peripheral distribution-area A2 extending outwards from r. If there are more than one distribution-slot, the following relations apply:

- If a central distribution-area A1 is associated with the most central distribution slot 32 then it extends to the centre of the cell.
- If a central distribution-area A1 is associated with a distribution slot 32 that surrounds another distribution slot 32, then it has an inner radius/distance to the centre that is equal to the outer radius/distance to the centre of the peripheral distribution-area A2 associated with the closest distribution-slot 32 of smaller radius/distance to the centre, thus branching by a factor is achieved, preferably the factor two is used.
- If a peripheral distribution-area A2 is associated with the most peripheral distribution slot 32, then it extends to the edge of the cell,
- If a peripheral distribution-area A2 is associated with a distribution slot 32 that is surrounded by another distribution slot 32, then it has an outer radius/distance to the centre that is equal to the inner periphery of the central distribution-area A1 associated with the closest distribution-slot 32 of greater radius/distance to the centre, During fluid flow calculations (see below) it has surprisingly been found the radius/distance to the centre r of each annular/rectilinear distribution-slot 32 should be chosen such that the area of the central distribution-area A1 is equal to or smaller than the area of the peripheral distribution-area A2. Preferably the radius/distance to the centre r of the distribution-slot 32 should be chosen such that the ratio between the central or adjacent inner distribution-area A1 to the peripheral or adjacent outer distribution-area A2 (A1:A2) is in the interval 30:70 to 49.9:50.1, more preferably in the interval 37:63 to 49.9:50.1, even more preferably in the interval 40:60 to 49.9:50.1, even more preferably 42:58 to 48:52 and most preferably approximately 45:55.

To meet the above requirements the internal flow connection system preferably is essentially symmetric, more preferably rotationally symmetric, and comprised of a branched channel structure terminating at said distribution-slots.

Figure 2A:
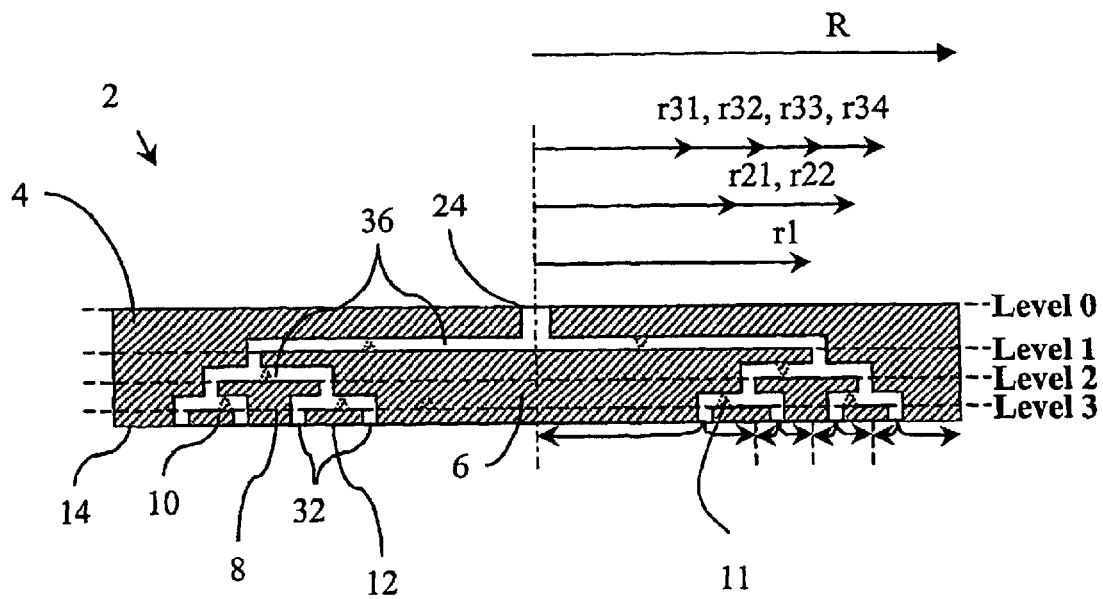
FIG. 2a is a side view of a first embodiment of a distribution system according to the invention, in cross-section.

FIG. 2 shows an example of a three level distribution system 2 according to the present invention in cross-section. The distribution system 2 is essentially rotationally symmetric and is comprised of a disc shaped main body 4, a circular distribution body 6, and three annular distribution bodies 8, 10 and 12.

Figure 2B:
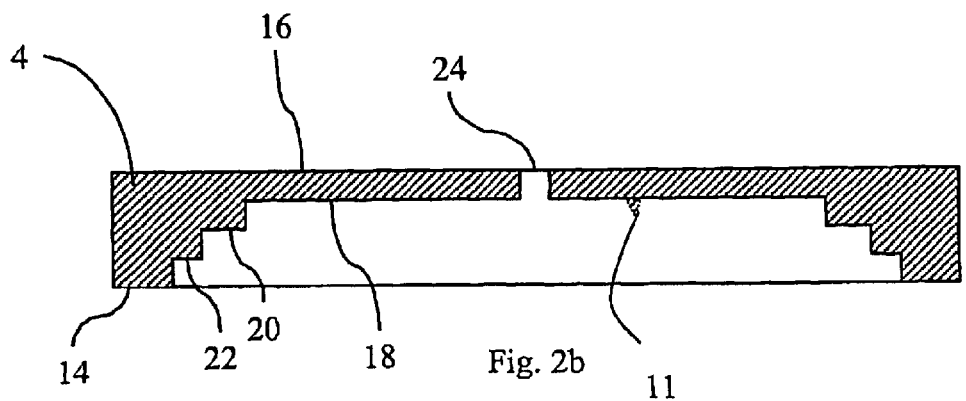
FIG. 2b is a side view of the main body in the distribution system shown in FIG. 2a, in cross-section.

FIG. 2b shows the main body 4, which has a top and a bottom surface 14 and 16, and three concentric circular recesses 18, 20 and 22 formed in the bottom surface 16. The recesses 18, 20 and 22 are arranged preferably such that the recess with smallest radius i.e. recess 18 is the deepest, the next smallest is the next deepest i.e. recess 20, and the largest is the most shallow i.e. 22. Due to this arrangement of the recesses 18, 20 and 22, the bottom surface 16 of the main body 4 show a stair-like edge around its periphery. Each recess 18, 20 and 22 defines a distribution level (level 1, 2 and 3) within the distribution system 2. The main body 4 further comprises an inlet connection 24 between the sample inlet and the first recess (level 0). This inlet connection 24 is preferably formed such that liquid entering through the same is distributed in an essentially rotationally symmetric manner.

Figure 2C:
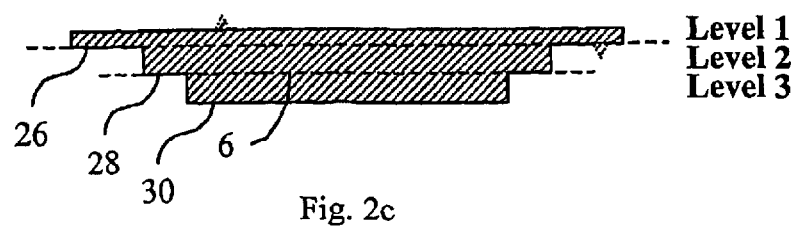
FIG. 2c is a side view of the distribution body in the distribution system shown in FIG. 2a, in cross-section.

The circular distribution body 6 is concentrically arranged in said recesses. As is shown in FIG. 2c, the circular distribution body 6 is comprised of three disc-shaped portions 26, 28 and 30, one for each level (level 1, 2, 3 . . . ) as defined by said recesses 18, 20 and 22, each disc-shaped portion 26, 28 and 30 having a smaller radius than the one corresponding to the previous level. The circular distribution body 6 may be seen upon as it is comprised of three individual disc-shaped portions 26, 28 and 30 stacked on top of each other, but it is preferably comprised of one solid body. The first disc-shaped portion 26 is formed such that an annular distribution slot 32 is formed between the inner periphery of the first recess 18 and the outer periphery of the first disc-shaped portion 26, level 1, and that a radial flow connection is formed between the top of the circular distribution body 6 and the bottom of the first recess 18.

The three annular distribution bodies 8, 10 and 12 are concentrically arranged in concentric annular recesses defined by the circular recesses 18, 20 and 22 of level two or higher and corresponding disc-shaped portions 26, 28 and 30 of the circular distribution body 6. Each of the annular distribution bodies 8, 10 and 12 are formed such that an annular distribution slot 32 is formed at its inner and outer periphery respectively. The annular distribution bodies 8, 10 and 12 are further formed such that a radial flow connection 36 is created between at least one annular distribution slot 32 of the previous level and the annular distribution slots 34 associated with that annular distribution body 8, 10 and 12, whereby at least two annular distribution slots are formed in each of the levels two or higher.

The radial flow connections 36 may be formed by the circular distribution body 6 and/or the annular distribution bodies 8, 10 and 12 having spacing elements 11 such as distance pins that protrude from, or are positioned between, one or more of the distribution bodies' mutually facing surfaces. As shown by dotted lines in FIGS. 2a–2c the spacing elements 11 support the bodies 6, 8, 10 and 12 with respect to the bottom of the recesses 18, 20 and 22, thereby define the height of said radial flow connection 36.

Figure 3:
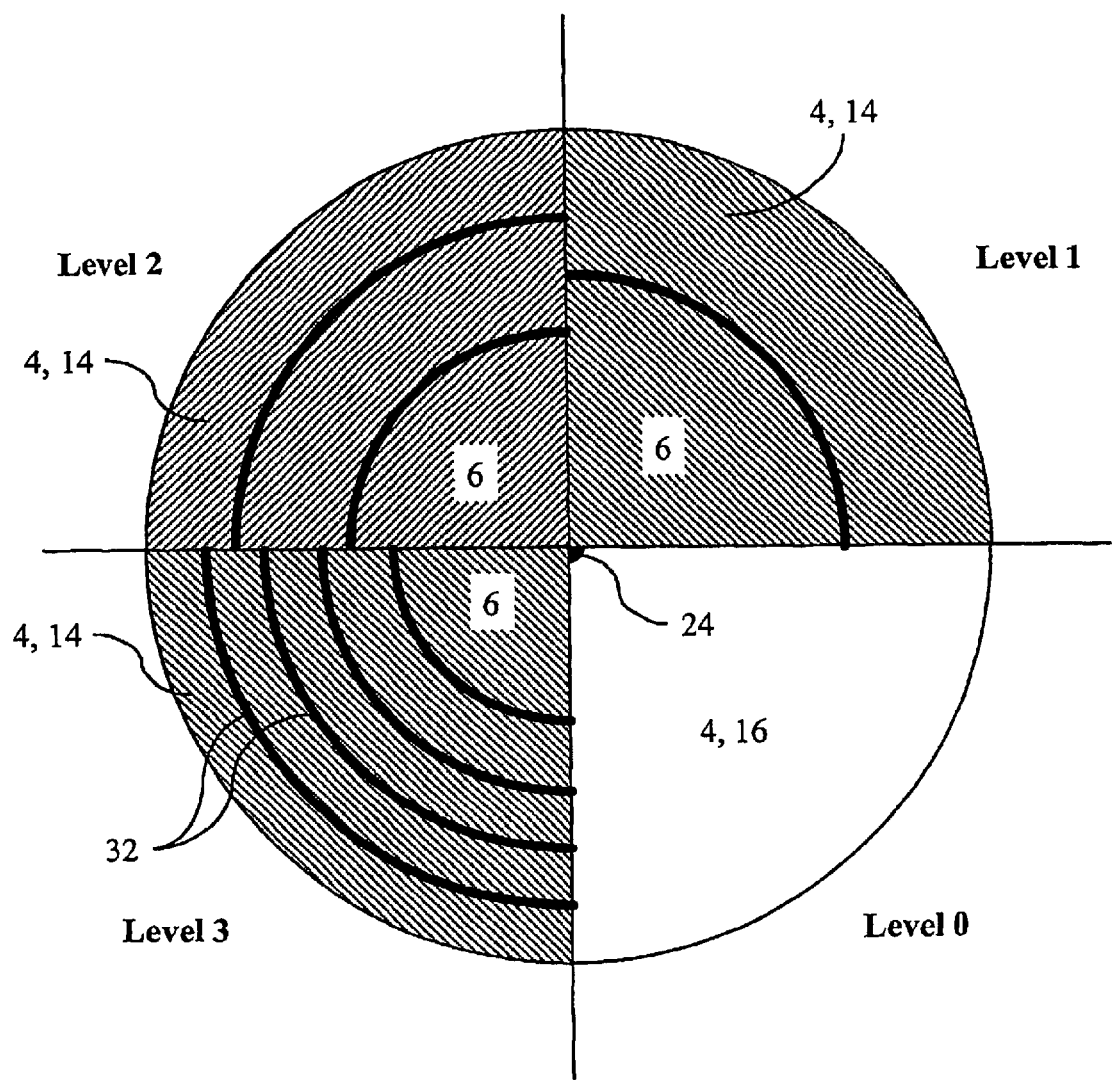
FIG. 3 is a top view of a first embodiment of distribution system according to the invention, partly in cross-section.

FIG. 3 is a top view of a distribution system according to the invention, partly in cross-section, wherein the radial relationship between the levels (0, 1, 2 and 3) can be seen.

Figure 4:
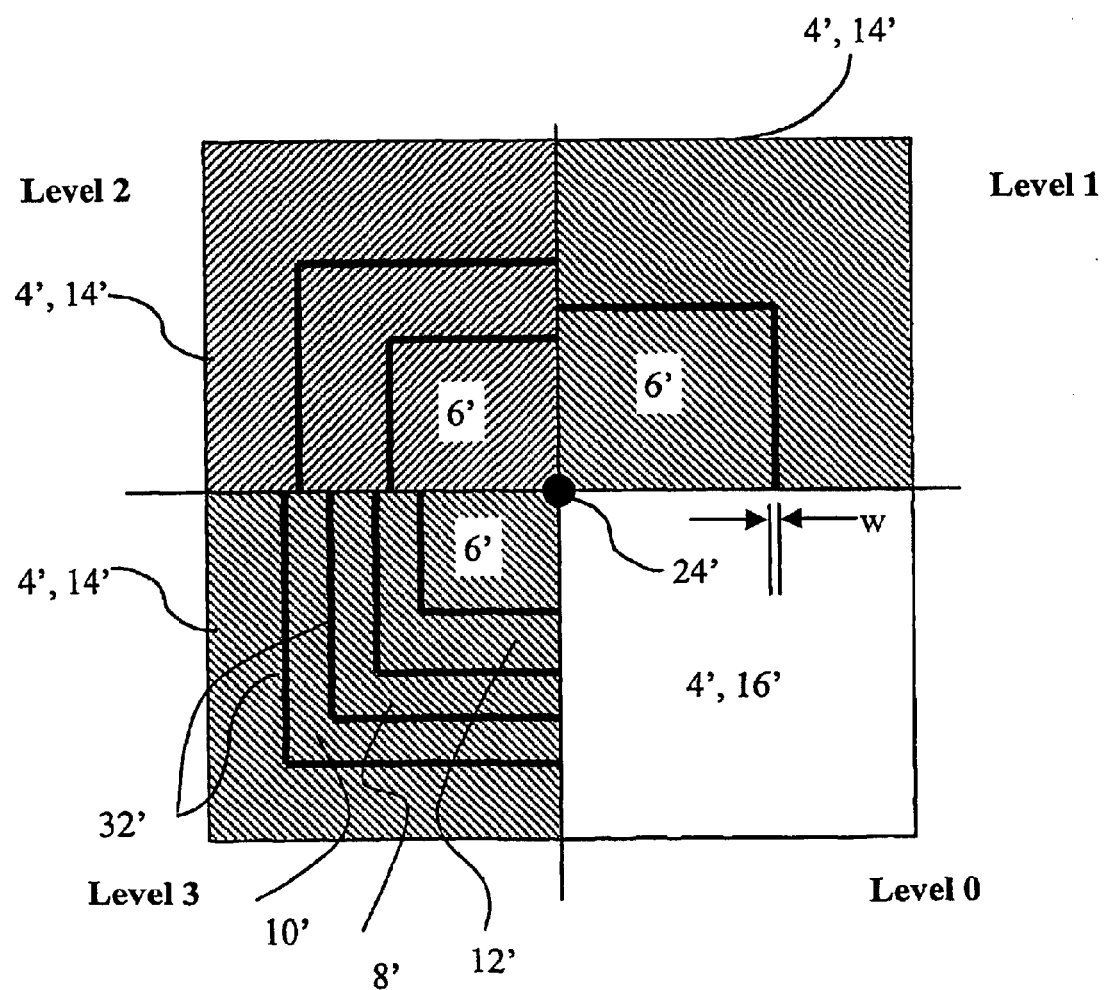
FIG. 4 is a top view of a second embodiment of distribution system according to the invention, partly in cross-section.

In FIG. 4 a second embodiment of a distribution system according to the invention is shown partly from the top and partly from the bottom. This embodiment is constructed in a similar manner to the first embodiment but differs from the first embodiment by using rectilinear, e.g. square or rectangular, plates instead of circular or annular plates. This means that the distribution slots are not circular but rectilinear. The distribution system 2' is essentially symmetric and is comprised of a square main body 4', a rectilinear distribution bodies 6' and three open rectilinear distribution bodies 8', 10' and 12' comprising square plates with centrally placed square openings formed in them. The distribution bodies are arranged to form rectilinear distribution slots 32'.

The distribution system 2 of the invention may be comprised of any number of distribution levels (level 1, 2, 3 . . . ). The upper limit is set by practical production limitations, and when the number of annular/rectilinear distribution slots 32 in the last layer is sufficiently high, the effect of increasing the number of slots 32 is infinitesimal.

The distribution system 2 according to the present invention may be comprised of any suitable material, such as a metal, a polymer or the like. Preferably it is made of stainless steel or a rigid polymer that is resistant to all liquid solutions that may be entered into the system. The manufacturing of the components in the distribution system 2 may comprise moulding, machining, form pressing and the like. Each of the components in the distribution system 2 may be comprised of one solid body or an assembly of two or more sub-bodies, depending on the design of the system.

Figure 5:
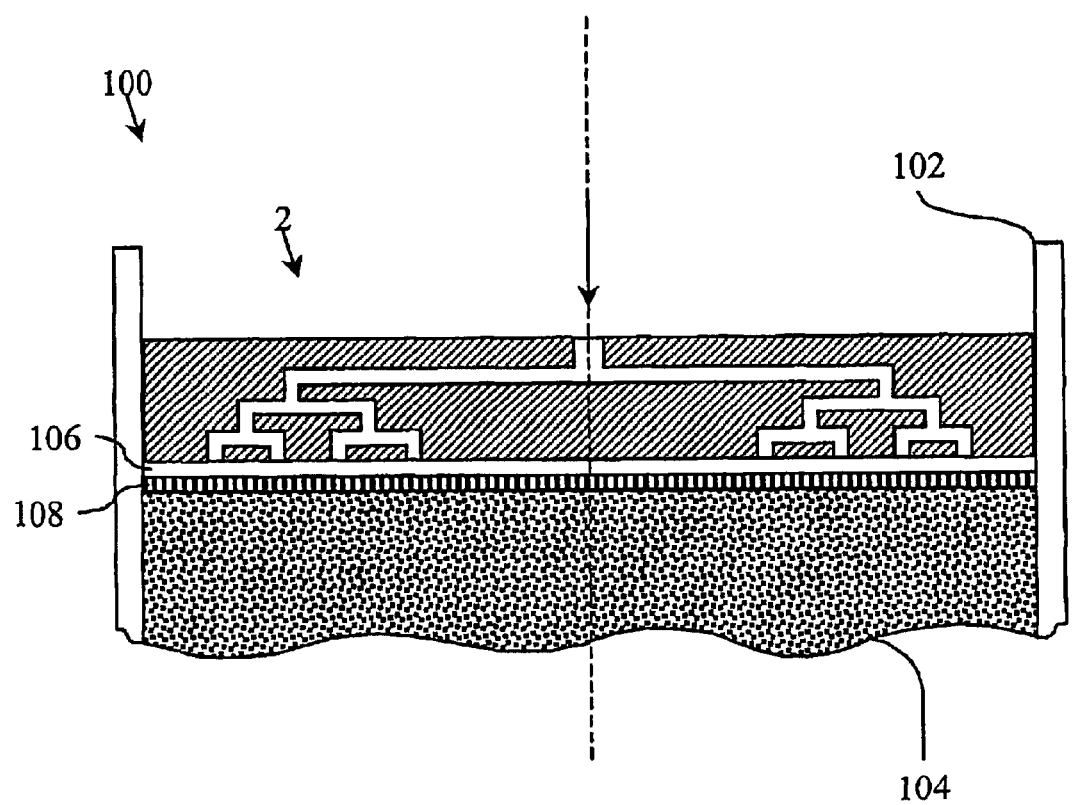
FIG. 5 is a side view of a separator system in cross-section, comprising a distribution system according to the invention.

FIG. 5 is a side view of a separator system 100 in cross-section, comprising sidewalls 102, packing 104, and a distribution system 2 according to the invention. As is shown in FIG. 3, the distribution system 2 may further comprise a distribution gap 106 occupying a cross-sectional region of a predetermined height, which is located directly after the distribution slots 32 (level 3) in the longitudinal direction of flow to achieve optimum distribution performance. This may be achieved by arranging a perforated plate 108 at a predetermined distance from the bottom of the main body and the distribution body, whereby at the same time the packing is prevented from entering the distribution gap 106. If a fine packing material (for example made from discrete particles) is used, the perforated plate 108 may have a fine mesh or an equivalent filter material attached on the side facing the packing 104. In one special embodiment the perforated plate 108 is comprised of a perforated plate having spacing elements that protrudes from the top surface, the spacing elements thus support the plate with respect to the bottom of the main body 4 and the distribution 6 body, thereby defining the height of said distribution gap 106. In a similar embodiment said circular distribution body 6 comprise spacing elements that protrude from the top surface, the spacing elements then supports the distribution body 6 with respect to the bottom of the recess 18, thereby defining the height of said radial flow connection 36 in the first level. Furthermore said annular distribution bodies 8, 10, 12 may each comprise spacing elements that protrude from the top surface, the spacing elements then supports the distribution bodies 8, 10, 12 with respect to the bottom surfaces of the previous level, thereby defining the height of said radial flow connection 36 in that level.

In one preferred embodiment the number of concentrically arranged annular distribution bodies 8, 10 and 12 in each level is chosen such that the number of annular distribution slots increases with a factor two for each successive level. This type of branching leads to the most efficient distribution of the liquid sample, but other arrangements may also be chosen.

To minimise turbulence and the like in the radial flow connections 36, edges and corners therein are preferably rounded by fillets or chamfers that are applied to the edges of the distribution bodies anywhere the fluid is changing the main direction of flow.

In one further embodiment the distribution system 2 is formed such that it may be fitted as a distribution cartridge in a cell end-piece which can be combined with a standard end piece and standard nozzle for each column diameter. A design advantage of this embodiment is the fact that all column end pieces (adapters) may be fitted with one single inlet nozzle for the mobile phase irrespective of the complexity of the internal fluid distribution system 2. A modular distribution system of this type allows replacement of the distribution system cartridge to adapt the column for a different type of media/application, whereby reduced cost and increased flexibility is achieved.

Figure 6A:
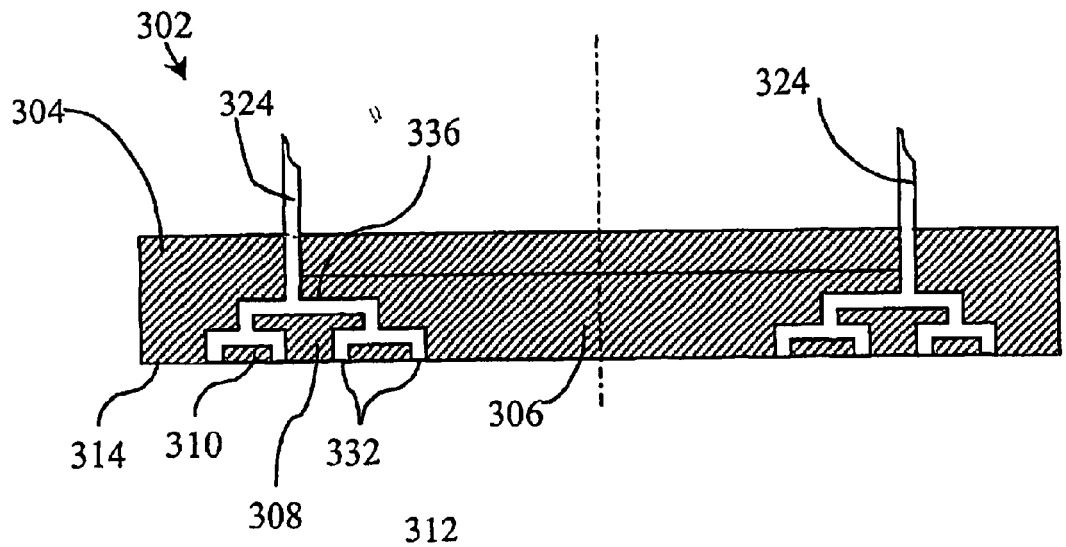
FIG. 6a is a side view of another embodiment of a distribution system according to the invention, in cross-section.
Figure 6B:
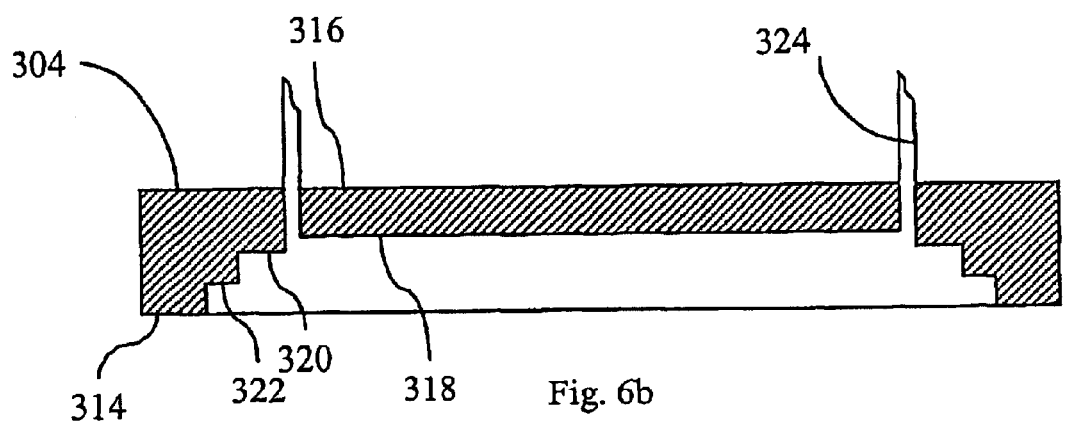
FIG. 6b is a side view of the main body in the distribution system shown in FIG. 6a, in cross-section section.
Figure 6C:
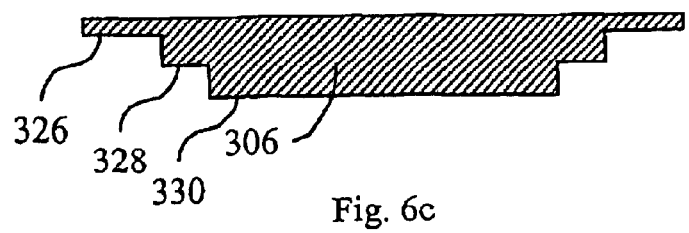
FIG. 6c is a side view of the distribution body in the distribution system shown in FIG. 6a, in cross-section.

In one further embodiment of the invention, shown in FIGS. 6a–6c, the distribution system 302 is formed of a plurality of inlet connections 324 leading to the first recess. This is particularly advantageous with large diameter or high flow rate columns in which dividing the sample into a plurality of inlets in a form of pre-distribution helps ensure an even distribution over the sample over the cross-sectional area of the column. These inlet connections are preferably arranged systemically.

In a further embodiment of the present invention, the distribution system is formed such that it may be fitted with one or multiple nozzles dedicated for the introduction of the packing material as a slurry into the cell. Preferably, one slurry nozzle is fitted in the centre of the cell/end piece/ distribution system/filter. In such cases the liquid inlet 24 has to be arranged such that it is capable of providing a radially homogeneous flow, e.g. it may be of annular shape and surround said slurry nozzle.

Figure 7:
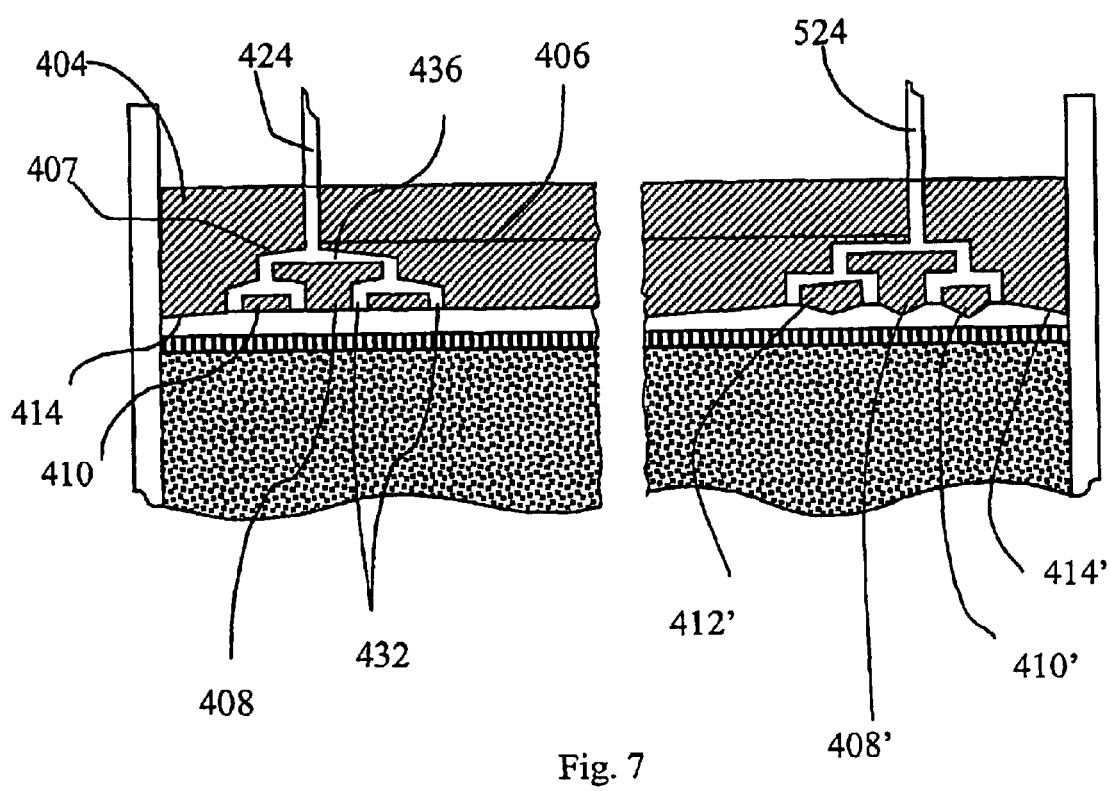
FIG. 7 shows partial side views of two further embodiments of a distribution system according to the invention, in cross-section.

The advantage of using fluid flow paths of constant height (for example spacing elements of constant height) lies in the simplicity of the mechanical design and low production cost. In further preferred embodiments, two of which are shown respectively in the left and right sides of FIG. 7, the radial flow connections 436 have a conical shaped fluid path with the largest channel height at the position of highest fluid velocity to balance the volumetric flow in the path. With regard to chromatographic performance, a conical shaped radial flow connection 436 with large channel height near the position of highest fluid velocity is preferable. In the left side of FIG. 9 the conical shaped flow connection is formed by forming conical surfaces on an inner face 407 and on the lower surface 414 of the main body 404, and annular distribution body 408 facing the circular and annular distribution bodies 406–410. In the right side of FIG. 9 the conical shaped flow connection is formed by forming conical surfaces on the faces of the circular and annular distribution bodies 408', 410' and 412'. It is also conceivable to make some or all of the faces of the main body and circular and annular distribution bodies conical. Such a design could be implemented easily when building the distribution system for example from cast/moulded material.

The principle of conical shaped fluid paths may further be applied to the distribution gap, whereby it may be at least partly conical shaped with respect to the distribution slots, as shown on the right side of FIG. 9 such that the fluid path has a larger channel height at the position of higher fluid velocity or where the volumetric flow is greatest.

Due to the simple design the distribution system 2 according to the invention is scalable with respect to the chromatographic functionality, in that it:

provides similar chromatographic performance for a given media/application at different column diameters, provides chromatographic performance that is adjusted to the requirements of different media/applications at a given column diameter Scalability in the design is achieved by:

adjusting the number of pre-distribution levels (0, 1, 2, 3 . . . ) for a given column diameter adjusting the geometry of the flow connections 36 for a given pre-distribution level in combination with an adjustment of the fluid distribution gap 106.

Furthermore, a priori determination of the design within a standard column range by calculation is possible by considering a number of design cases characterising application types in combination with design rules for mean dimensions, which are partly described below.

Figure 8:
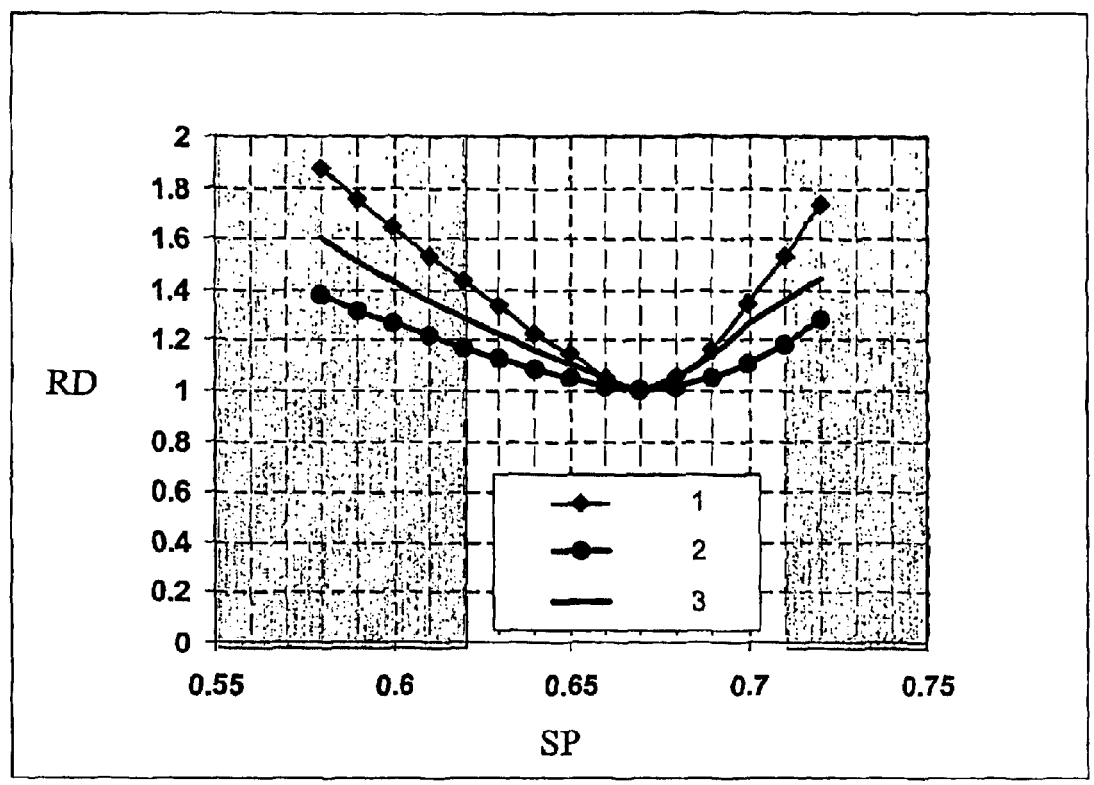
FIG. 8 is a graph showing a comparison of dispersion efficiency against slot position for 3 examples of columns in accordance with the present invention.

Numerical parameter studies with a fluid dynamics code specifically developed for the distributor design revealed that the most favorable placement of the distribution slots 32 is chosen such that the ratio of the central distribution-area A1 to the peripheral distribution-area A2 is approximately 45:55 for a one-slot distribution system. FIG. 8 shows a comparison of relative dispersion RD introduced by the distributor against slot position SP for 3 examples of columns with one-slot distribution systems. The relative dispersion denotes the dispersion introduced by the liquid distribution system normalised to the minimum dispersion introduced by the liquid distribution system with an optimized slot position. The dispersion introduced by the liquid distribution system relative to the overall dispersion of the chromatographic unit is different in the three examples. In case 1 the column diameter is 450 mm, the distribution channel height is 1 mm, the pre-distribution channel height 2 mm, the media 180 $\mu$m mean diameter particles, the packed bed permeability 1.E-11 m$^2$ and the bed height 100 mm. In case 2 the column diameter is 450 mm, the distribution channel height is 0.4 mm, the pre-distribution channel height 0.8 mm, the media 30 $\mu$m mean diameter particles, the packed bed permeability 5.E-13 m$^2$ and the bed height 150 mm. In case 3 the column diameter is 450 mm, the distribution channel height is 0.6 mm, the pre-distribution channel height 1 mm, the media 90 $\mu$m mean diameter particles, the packed bed permeability 2.E-12 m$^2$ and the bed height 100 mm. All the channels are of constant height. In all three examples the most favorable performance was achieved with a slot placement $r_d/R=0.67$ (where R is the radius of the column and $r_d$ is the radial distance from the centre of the column of the middle of the slot) which corresponds to a ratio of the central distribution-area A1 to the peripheral distribution-area A2 that is approximately 45:55.

On basis of the computations, one can show that scalability in the design of the distribution system 2 according to the invention can be achieved by designing a distribution system 2 with a dispersion appropriate for each individual combination of packing geometry and column size, packing properties, fluid properties and velocity, and specific application demands. The preferred variables for the design of the distribution system 2 is the height of the radial flow connection 36 and distribution gap, whereas the aspect ratios for the placement of the distribution slot 32 as such can be kept constant.

While the invention has been illustrated by examples in which the distribution system comprises continuous distribution slots 32, i.e. slots forming a continuous circular opening, it is conceivable to use distribution slots that are not continuous. These could, for example, be formed of a plurality of holes or (curved or straight) slots arranged in a circle or square, the holes being positioned and dimensioned such that they distribute fluid with substantially the same effect as a continuous distribution slot.

Additionally it is possible to use column cross-sectional and distribution slot shapes other than circular, for example, rectilinear (e.g. square or rectangular), triangular, pentagonal or other polygonal shapes, or shapes formed by intersecting circles.

What is claimed is:

1. A uniform fluid distribution system (2) for use with a liquid transfer system (100) for maintaining an interface between liquid phases within a large scale separator system including a cell having a circular or rectilinear cross-sectional shape into which liquid may be introduced as discrete phases at an inlet zone occupying a first approximately transverse cross-sectional region of said cell and outputted at an outlet zone occupying a second approximately transverse cross-sectional region of said cell, said distribution system comprising at least one liquid inlet (24) and at least two distribution outlets (32), which are connected by an internal flow connection system (36), wherein, said distribution outlets (32) consist of only concentric annular distribution-slots (32) for a cell having a circular cross-sectional shape or only rectilinear distribution-slots (32') for a cell having a rectilinear cross-sectional shape, each distribution-slot (32; 32') with an unique radius/distance r to the midpoint between an inner slot-radius/distance to the midpoint and an outer slot-radius/distance to the midpoint, said radii/distances to the midpoint defining a slot-width w, through which annular/rectilinear distribution-slot (32: 32') liquid entering said inlet (24) is distributed to said cell along an approximately horizontal plane.

2. The distribution system (2) of claim 1, wherein each distribution-slot (32) provides a distributed liquid flow to an associated central distribution-area (A1) extending inwards from r and a peripheral distribution-area extending outwards from r, and further wherein if said central distribution-area (A1) is associated with the most central distribution slot (32), then it extends to the centre of the cell, if said central distribution-area (A1) is associated with a distribution slot (32) that surrounds another distribution slot (32), then it has an inner radius/distance to the midpoint that is equal to the outer radius/distance to the midpoint of the peripheral distribution-area associated with the closest distribution-slot (32) of smaller radius/distance to the midpoint, if said peripheral distribution-area is associated with the most peripheral distribution slot (32), then it extends to the edge of the cell, if said peripheral distribution-area is associated with a distribution slot (32) that is surrounded by another distribution slot (32), then it has an outer radius/distance to the midpoint that is equal to the inner periphery of the central distribution-area (A1) associated with the closest distribution-slot (32) of greater radius/distance to the midpoint, and the radius/distance to the midpoint r of each distribution-slot (32) is chosen such that the central distribution-area (A1) is equal to or smaller than the peripheral distribution-area (A2).

3. The distribution system (2) of claim 1, wherein the radius/distance to the midpoint r of each distribution-slot (32) is chosen such that the area of the adjacent inner distribution-area for each slot is less than the adjacent outer distribution-area for that slot.

4. The distribution system (2) of claim 1, wherein the radius/distance to the midpoint r of each distribution-slot (32) is chosen such that the ratio between the central distribution-area to the peripheral distribution-area is in the interval 35:65 to 42:58.

5. The distribution system (2) of claim 1, wherein the radius/distance to the midpoint r of each distribution-slot (32) is chosen such that the ratio between the central distribution-area to the peripheral distribution-area is approximately 40:60.

6. The distribution system (2) of claim 1, wherein the internal flow connection system (36) is essentially rotationally symmetric.

7. The distribution system (2) of claim 1, wherein the internal flow connection system (36) is comprised of a branched channel structure terminating at said distribution-slots (32).

8. The distribution system (2) of claim 1, which includes
a disc shaped main body (4) having a top and a bottom surface (14 and 16), said main body (4) having at least two concentric circular recesses (18, 20, 22) formed in the bottom surface (16), each recess (18, 20, 22) defining a distribution level (level 1, 2, 3 . . . ), each recess (18, 20, 22) having a larger radius than the one defining the previous level, and an inlet connection between the inlet (24) and the first recess (18) (level 0), and
a circular distribution body (6) concentrically arranged in said recesses (18, 20, 22) and formed such that it is comprised of one disc-shaped portion (26, 28, 30) for each level (level 1, 2, 3 . . . ) as defined by said recesses (18, 20, 22), each disc-shaped (26, 28, 30) portion having a smaller radius than the one corresponding to the previous level,
whereby, in the first level, an annular distribution slot (32) is formed between the inner periphery of the first recess (18) and the outer periphery of the first disc-shaped portion (26) and a radial flow connection (36) is formed between the top of the circular distribution body (6) and the bottom of the first recess (18), and
at least one annular distribution body (8, 10, 12) concentrically arranged in a concentric annular recess defined by a circular recess (20, 22) of level two or higher and the corresponding disc-shaped portion (28, 30) of the circular distribution body (6), each annular distribution body (8, 10, 12) being formed such that an annular distribution slot (32) is formed at its inner and outer periphery respectively and such that a radial flow connection (36) is created between at least one annular distribution slot (32) of the previous level and the annular distribution slots (32) associated with that annular distribution body (8, 10, 12), whereby at least two annular distribution slots (32) are formed.

9. The distribution system (2) of claim 8, wherein the number of concentrically arranged annular distribution bodies (8, 10, 12) in each level is chosen such that the number of annular distribution slots (32) increases with a factor two for each successive level.

10. The distribution system (2) of claim 8, wherein said circular distribution body (6) comprise spacing elements that protrude from the top surface, the spacing elements supports the distribution body (6) with respect to the bottom of the recess (18), thereby defining the height of said radial flow connection (36) in the first level.

11. The distribution system (2) of claim 8, wherein said annular distribution bodies (8, 10, 12) each comprise spacing elements (11) that protrude from the top surface, the spacing elements being able to support the distribution bodies (8, 10, 12) with respect to the bottom surfaces of the previous level, thereby defining the height of said radial flow connection (36) in that level.

12. The distribution system (2) of claim 1, wherein the internal flow connection system (36) has a conical shaped fluid path with large channel height at the position of highest fluid velocity.

13. The distribution system (2) of claim 1, including a distribution gap (106) occupying a cross-sectional region of a predetermined height, located directly after the distribution slots (32) of the highest level (level 3) in the longitudinal direction of flow.

14. The distribution system (2) of claim 13, wherein the distribution gap (106) is conically shaped with respect to the distribution slots (32), and is formed such that the fluid path has a larger channel height at the position of higher fluid velocity.

15. The distribution system (2) of claim 1, including a perforated plate (108) terminating the distribution gap in the longitudinal direction of flow.

16. The distribution system (2) of claim 15, wherein the perforated plate (108) is comprised of a perforated plate having spacing elements that protrude from the top surface, the spacing elements supports the plate with respect to the bottom of the main body (4) and the distribution bodies (6, 8, 10, 12), thereby defining the height of said distribution gap (106).

17. The distribution system (2) of claim 1, wherein the flow connection system (36) comprises fillets/chamfers applied to the edges of the distribution bodies (6, 8, 10, 12) anywhere the fluid is changing the main direction of flow.

* * * * *